United States Patent
Chen et al.

(10) Patent No.: US 12,542,010 B2
(45) Date of Patent: Feb. 3, 2026

(54) AUTOMOBILE DIAGNOSIS SYSTEM AND METHOD, AND CLOUD SERVER

(71) Applicant: Xi'an Autel Intelligent Technology Co., Ltd., Xi'an (CN)

(72) Inventors: Jie Chen, Xi'an (CN); Liang Tang, Xi'an (CN)

(73) Assignee: XI'AN AUTEL INTELLIGENT TECHNOLOGY CO., LTD., Xi'an (CN)

( * ) Notice: Subject to any disclaimer, the term of this patent is extended or adjusted under 35 U.S.C. 154(b) by 223 days.

(21) Appl. No.: 18/555,870

(22) PCT Filed: Mar. 18, 2022

(86) PCT No.: PCT/CN2022/081671
§ 371 (c)(1),
(2) Date: Oct. 18, 2023

(87) PCT Pub. No.: WO2022/222657
PCT Pub. Date: Oct. 27, 2022

(65) Prior Publication Data
US 2024/0212399 A1    Jun. 27, 2024

(30) Foreign Application Priority Data
Apr. 21, 2021 (CN) .......................... 202110431796.6

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01)

(58) Field of Classification Search
CPC .. G07C 5/008; G07C 5/0808; G05B 23/0213; G05B 2219/24065
See application file for complete search history.

(56) References Cited

U.S. PATENT DOCUMENTS

| 2018/0284737 A1 | 10/2018 | Cella |
| 2019/0371091 A1 | 12/2019 | Frisch |
| 2020/0005633 A1* | 1/2020 | Jin ........................ H04W 12/02 |

FOREIGN PATENT DOCUMENTS

| CN | 104133467 A | 11/2014 |
| CN | 105204497 A | 12/2015 |

(Continued)

OTHER PUBLICATIONS

Search report of CN application No. 202110431796.6 issued on Mar. 1, 2022.

(Continued)

*Primary Examiner* — Michael V Kerrigan
(74) *Attorney, Agent, or Firm* — Andrew C. Cheng (57) ABSTRACT

An automobile diagnosis system and method, and a cloud server. The system includes a cloud server, an end-side device, and at least one edge node; wherein, the cloud server is in communication connection with each edge node, and is used for acquiring diagnosis instructions to generate diagnosis data and vehicle communication logics, and sending the diagnosis data and the vehicle communication logics to an edge node having the minimum communication delay with the end-side device; the edge node is used for performing data interaction with the end-side device to acquire diagnosis results and send the diagnosis results to the cloud server; and the end-side device is in communication connection with the edge node and a vehicle, and is used for sending vehicle data of the vehicle and the diagnosis results to the edge node.

13 Claims, 6 Drawing Sheets

(56) References Cited

FOREIGN PATENT DOCUMENTS

| | | | |
|---|---|---|---|
| CN | 107305372 | A | 10/2017 |
| CN | 109873851 | A | 6/2019 |
| CN | 109933004 | A | 6/2019 |
| CN | 111340280 | A | 6/2020 |
| CN | 111464651 | A | 7/2020 |
| CN | 111709542 | A | 9/2020 |
| CN | 111770016 | A | 10/2020 |
| CN | 113242320 | A | 8/2021 |
| CN | 113268047 | A | 8/2021 |

OTHER PUBLICATIONS

International Search Report of PCT Patent Application No. PCT/CN2022/08167 issued on May 24, 2022.

* cited by examiner

AUTOMOBILE DIAGNOSIS SYSTEM AND METHOD, AND CLOUD SERVER

CROSS-REFERENCE TO RELATED APPLICATIONS

The present application is the National Stage application for PCT patent application Serial No. PCT/CN2022/081671, filed on Mar. 18, 2022, which claims the priority to Chinese Patent Application No. 202110431796.6, entitled "Automobile Diagnosis System and Method, and Cloud server", filed on Apr. 21, 2021, before the Patent Office of the China National Intellectual Property Administration, which is incorporated herein by reference in its entirety.

TECHNICAL FIELD

The present application relates to the technical field of automobiles, and in particular to an automobile diagnosis system and method, and a cloud server.

BACKGROUND OF THE INVENTION

With the development of the automobile industry, modern electronic control technology has penetrated into every component of automobiles, and the structures of automobiles have become more and more complex. Moreover, with the increasing level of automation, the demand for automobile diagnosis and programming in the automobile maintenance industry will also increase increasingly, and the corresponding requirements for the ability of maintenance technicians will also be higher and higher.

Currently, most diagnosis applications on the market run on terminal devices, which suffers from the technical problem of insufficient computing power.

SUMMARY OF THE INVENTION

One purpose of embodiments of the present application is to provide an automobile diagnosis system and method, and a cloud server, which can improve the computing power of automobile diagnosis.

In the first aspect, in the embodiments of the present application is provided an automobile diagnosis system which includes a cloud server, an end-side device, and at least one edge node; wherein,
the cloud server is in communication connection with each edge node, is used to acquire and execute diagnosis instructions to generate diagnosis data and vehicle communication logics, and send the diagnosis data and the vehicle communication logics to an edge node having the minimum communication delay with the end-side device;
the edge node is used for performing data interaction with the end-side device based on the diagnosis data and the vehicle communication logics sent by the cloud server, to acquire diagnosis results sent by the end-side device and send the diagnosis results to the cloud server; and
the end-side device is in communication connection with the edge node and a vehicle, and is used for sending vehicle data of the vehicle and the diagnosis results to the edge node.

In some embodiments, after receiving connection instructions, the cloud server determines an edge node closest to the vehicle position in communication with the end-side device, with the edge node closest to the vehicle position having the minimum communication delay with the end-side device.

In some embodiments, the cloud server includes:
a diagnosis application unit, for receiving and executing the diagnosis instructions to generate the diagnosis data and the vehicle communication logics;
a device management unit connected to the diagnosis application unit, wherein the device management unit is used to authenticate the end-side device and forward the connection instructions to the end-side device, so that the end-side device is connected to the edge node; and
a node management unit, for forwarding the diagnosis data and the vehicle communication logics to the edge node.

In some embodiments, the diagnosis application unit is also used to receive the connection instructions and apply for an edge node to the node management unit, so that the node management unit returns available edge nodes, wherein, the available edge nodes include an edge node closest to the vehicle position.

In some embodiments, after receiving the connection instructions, the diagnosis application unit sends the connection instructions to the device management unit, so that the device management unit forwards the connection instructions to the end-side device, for the end-side device to be connected to the edge node closest to the vehicle position.

In some embodiments, the diagnosis instructions include a first diagnosis logic and a second diagnosis logic;
the cloud server is also used to execute the first diagnosis logic to generate first diagnosis data and a first vehicle communication logic; and
the edge node is also used to execute the second diagnosis logic to generate second diagnosis data and a second vehicle communication logic, with the second diagnosis logic less complex than the first diagnosis logic.

In some embodiments, the cloud server is also used to send the second diagnosis logic to the edge node having the minimum communication delay with the end-side device, so that the edge node executes the second diagnosis logic to generate the second diagnosis data and the second vehicle communication logic, and performs data interaction with the end-side device based on the second diagnosis data and the second vehicle communication logic.

In some embodiments, after performing a read and write operation of the vehicle data, the edge node automatically clears the diagnosis data and the vehicle communication logics thereon.

In some embodiments, the system further includes:
terminal devices in communication connection with the cloud server, which are used to send the diagnosis instructions to the cloud server and receive the diagnosis results sent by the cloud server.

In the second aspect, in the embodiments of the present application is provided an automobile diagnosis method applied to the automobile diagnosis system described in the first aspect, the method comprises:
acquiring the diagnosis instructions;
executing the diagnosis instructions and acquiring the vehicle data to generate the diagnosis data and the vehicle communication logics;
based on the predetermined edge node, sending the diagnosis data and the vehicle communication logics to the edge node, with the edge node having the minimum communication delay with the end-side device; and
receiving the diagnosis results sent by the edge node, with the diagnosis results obtained by the data interaction between the edge node and the end-side device.

In some embodiments, the diagnosis instructions include the first diagnosis logic and the second diagnosis logic, the cloud server is used for executing the first diagnosis logic to generate the first diagnosis data and the first vehicle communication logic; and the edge node is used for executing the second diagnosis logic to generate the second diagnosis data and the second vehicle communication logic, with the second diagnosis logic less complex than the first diagnosis logic.

In some embodiments, the method further comprises:

sending the second diagnosis logic to the edge node, so that the edge node executes the second diagnosis logic to generate the second diagnosis data and the second vehicle communication logic, and performs the data interaction with the end-side device based on the second diagnosis data and the second vehicle communication logic.

In the third aspect, in the embodiments of the present application is further provided a cloud server, which includes:

at least one processor; and a memory in communication connection with the at least one processor; wherein, the memory stores instructions executable by the at least one processor, and the instructions are executed by the at least one processor to enable the at least one processor to execute the automobile diagnosis method as described above.

In the fourth aspect, in the embodiments of the present application is provided a non-volatile computer-readable storage medium. The non-volatile computer-readable storage medium stores computer-executable instructions which are used to enable the cloud server to execute the automobile diagnosis method as described in the second aspect.

In the fifth aspect, in the embodiments of the present application is provided a computer program which includes program instructions, when the program instructions are executed by one or more processors in the cloud server, the cloud server is enabled to execute the automobile diagnosis method as described in the second aspect.

The embodiments of the present application have the beneficial effects as follows: different from existing technologies, in the embodiments of the present application are provided an automobile diagnosis system and method, and a cloud server. The system includes a cloud server, an end-side device and at least one edge node; wherein the cloud server is in communication connection with each edge node, and is used for acquiring and executing diagnosis instructions to generate diagnosis data and vehicle communication logics, and sending the diagnosis data and the vehicle communication logics to an edge node having the minimum communication delay with the end-side device; the edge node is used for performing data interaction with the end-side device based on the diagnosis data and the vehicle communication logics sent by the cloud server to acquire diagnosis results sent by the end-side device and send the diagnosis results to the cloud server; and, the end-side device is in communication connection with the edge node and a vehicle, and is used for sending vehicle data of the vehicle and the diagnosis results to the edge node. On the one hand, the embodiments of the present application can improve the diagnosis ability of computation by the cloud server executing the diagnosis instructions. On the other hand, the data interaction between the edge node and the end-side device enables the remote vehicle assistance diagnosis and the intelligent diagnosis.

BRIEF DESCRIPTION OF DRAWINGS

One or more embodiments are exemplified by the pictures in the accompanying drawings, and these exemplary illustrations do not constitute a limitation on the embodiments. Components with the same reference numerals in the accompanying drawings represent similar components, and the figures in the accompanying drawings are not intended to be limited to scale unless otherwise stated.

DETAILED DESCRIPTION OF THE INVENTION

For purposes, technical solutions and advantages of the present application to be clearer, the present application will be further described in detail below in combination with accompanying drawings and embodiments. It should be understood that the specific embodiments described herein are only used to explain the present application and are not used to limit the present application. All other embodiments obtained by those skilled in the art without creative labor made, based on the embodiments of the present application, fall within the protection scope of the present application.

It should be noted that, without conflict, various features in the embodiments of the present application can be combined with each other, and the combinations all are within the protection scope of the present application. In addition, although functional modules are divided in schematic diagrams of devices and a logical sequence is shown in the flowchart, in some cases, the steps shown or described can be executed in a different module division from that in the devices or a different order from that in the flowchart. Furthermore, the words "first", "second", "third" and the like used in the present application do not limit the data and execution order, but only distinguish the same or similar items with basically the same functions and effects.

Before describing the present application in detail, the nouns and terms involved in the embodiments of the present application are explained. The nouns and terms involved in the embodiments of the present application are applicable to the following explanations.

(1) End-side device, referring to terminal device which can also be called Terminal, user equipment (UE), mobile station (MS), mobile terminal (MT), etc. The terminal device herein can specifically be a mobile phone, a tablet PC (Pad), a computer with wireless transceiver function, a virtual reality (VR) terminal device, an augmented reality (AR) terminal device, a wireless terminal in industrial control, a wireless terminal in self-driving, a wireless terminal in remote medical surgery, a wireless terminal in smart grid, a wireless terminal in transportation safety, a wireless terminal in smart city, a wireless terminal in smart home, and the like. In addition, the terminal device in the embodiments of the present application may also be a chip integrated on a certain device, and the communication with the network-side device can be realized through the chip, achieving the same functions as the end-side device.

(2) Edge node, referring to network device; the network device can be an access device through which the terminal-side device wirelessly accesses the mobile communication system, and also can be a base station (NodeB), an evolved NodeB (eNodeB), a transmission reception point (TRP), a next generation NodeB (gNB) in 5G mobile communication system, a base station in future mobile communication systems or an access node in WiFi systems; it can also be a wireless controller in cloud radio access network (CRAN) scenarios, and can also be a relay station, a vehicle-mounted device, a wearable device, and a network device in the future evolved public land mobile communication network (PLMN), etc. The edge nodes in the embodiments of the present application can also be a chip integrated on a certain device, and the communication with the end-side device can be realized through the chip, achieving the same functions as the edge nodes.

It should be noted that the embodiments of the present application do not limit the specific technologies and specific device forms used in the end-side device and the edge nodes.

Figure 1:
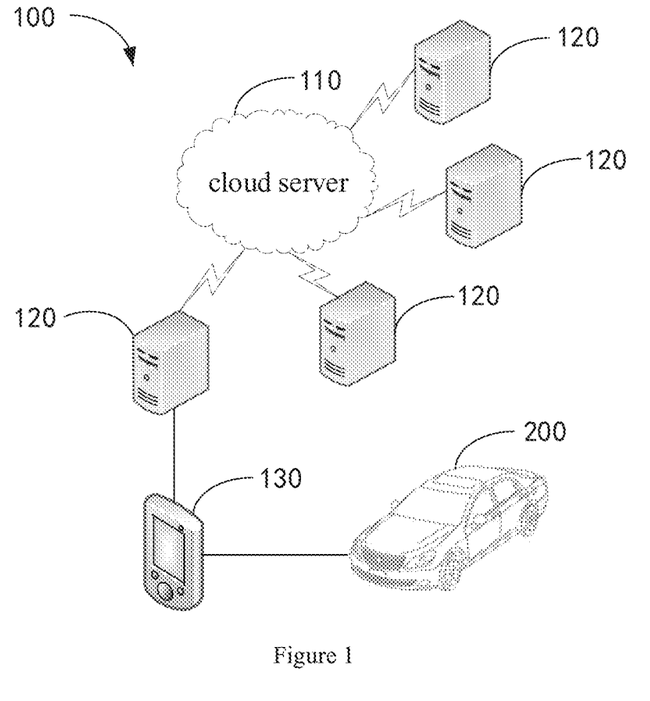
FIG. 1 is a schematic diagram of a hardware structure of an automobile diagnosis system provided in an embodiment of the present application.

Refer to FIG. 1, which is a schematic structure diagram of an automobile diagnosis system provided in an embodiment of the present application.

As shown in FIG. 1, the automobile diagnosis system 100 is in communication connection with a vehicle 200, wherein, the automobile diagnosis system 100 includes a cloud server 110, a plurality of edge nodes 120 and an end-side device 130 which is in communication connection with the edge nodes 120 and the vehicle 200 through communication interfaces.

Wherein, the cloud server 110 is in communication connection with each edge node 120 for acquiring and executing diagnosis instructions, to generate diagnosis data and vehicle communication logics, and send the diagnosis data and the vehicle communication logics to the edge node having the minimum communication delay with the end-side device.

Specifically, the cloud server 110 is in communication connection with terminal devices, and the terminal devices include at least one mobile terminal (not shown in figures) which is used to send connection instructions to the cloud server 110. After receiving the connection instructions, the cloud server determines one edge node closest to the vehicle position in communication with the end-side device, with the one edge node closest to the vehicle position having the minimum communication delay with the end-side device.

Wherein, the edge node 120 is used to perform data interaction with the end-side device 130 based on the diagnosis data and the vehicle communication logics sent by the cloud server 110, for acquiring diagnosis results sent by the end-side device 130 and sending the diagnosis results to the cloud server 110.

Wherein, the end-side device 130 is in communication connection with the edge node 120 and the vehicle 200, for sending vehicle data of the vehicle and the diagnosis results to the edge node 120.

Specifically, the end-side device 130 is used for mutual conversion of digital signals and OBD signals. For example, the end-side device 130 receives the digital signals sent by the edge node 120, converts the digital signals into OBD signals and sends the OBD signals to the vehicle 200; or, the end-side device 130 acquires the OBD signals sent by the vehicle 200, converts the OBD signals into digital signals and reports the digital signals to the edge node 120.

Specifically, the vehicle includes an automobile control unit system (ECU system), and the end-side device 130 is in communication connection with the automobile control unit system. For example, the automobile control unit system is scanned through a DLC interface to acquire communication fault codes, wherein, the end-side device 130 scans the automobile ECU system through the DLC interface and finds that there are the communication fault codes or the ECU system cannot be connected. Wherein, the end-side device 130 includes a diagnosis software which starts a maintenance wizard to guide users in detecting communication faults.

In the embodiments of the present application, the end-side device 130 includes a main control CPU, a display screen, a touch screen, a memory, various communication interfaces, and a communication device (supporting the CAN communication protocol) in communication with the vehicle. Wherein, the end-side device 130 includes an oscilloscope and a diagnosis instrument. The oscilloscope supports measurements of voltage, current, resistance, frequency and the like, supports a triggering function, and can store waveform data. The diagnosis instrument includes multiple pieces of application software, and for example, the application software of the diagnosis instrument includes automobile diagnosis software, oscilloscope measurement software, and automobile maintenance information or maintenance wizards. In the embodiments of the present application, the end-side device includes the automobile diagnosis application software and the oscilloscope software. During the operation of the diagnosis software, the measurement function of the oscilloscope can be called to extract data from the oscilloscope application and cooperate with the maintenance wizard for the next step of maintenance analysis. In the embodiments of the present application, the end-side device and the oscilloscope can be integrated into one electronic device, and for example, the end-side device includes one oscilloscope, for achieving the measurement function of the oscilloscope, or the electronic device includes the end-side device and the oscilloscope, for achieving all the functions of the end-side device and the oscilloscope.

During a test, the vehicle is connected to the end-side device through the DLC interface (standard OBD interface, 16 PIN) which supports the SAE J1962/ISO 15031-3 standard. Typically, PIN6 and PIN14 are used as diagnosis CAN data interfaces. In the end-side device, an interface is provided for oscilloscope probe contact. For cases where the internal CAN bus is not connected to the DLC interface, the oscilloscope probe needs to be connected to the connection point recommended by the end-side device.

Figure 2:
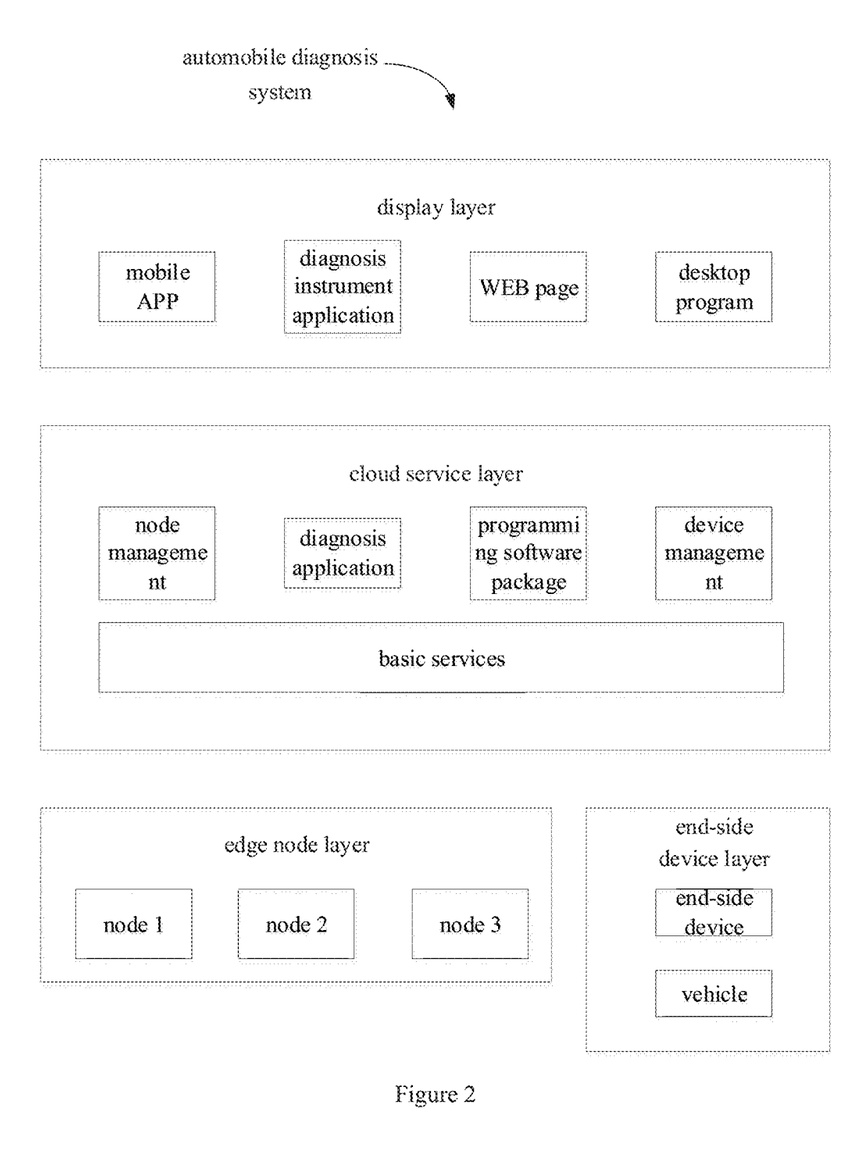
FIG. 2 is a schematic diagram of an underlying architecture of an automobile diagnosis system provided in an embodiment of the present application.

Further refer to FIG. 2 which is a schematic diagram of the underlying architecture of an automobile diagnosis system provided in an embodiment of the present application.

As shown in FIG. 2, the underlying architecture of the automobile diagnosis system includes a display layer, a cloud service layer, an edge node layer and an end-side device layer.

Specifically, the display layer responsible for user interface display and human-computer interaction, includes mobile APPs, diagnosis instrument applications, WEB pages, desktop programs and other display components.

Specifically, the cloud service layer is responsible for managing devices and edge nodes and running complex diagnosis logics to output the diagnosis data and the vehicle communication logics.

Specifically, the edge node layer is used to receive diagnosis programming data sent by the cloud service layer to run simple diagnosis logics.

Specifically, the end-side device layer is used for adaptive conversion of the diagnosis programming data (such as, conversion between the digital signals and the OBD signals), and is used as a communication channel between the vehicle and the cloud. It should be understood that the vehicle can recognize the OBD signals, but the cloud (cloud server) or display components in the display layer can only recognize the digital signals. Therefore, to achieve the communication between the cloud service layer and the display layer, it is necessary to perform the data conversion.

Figure 3:
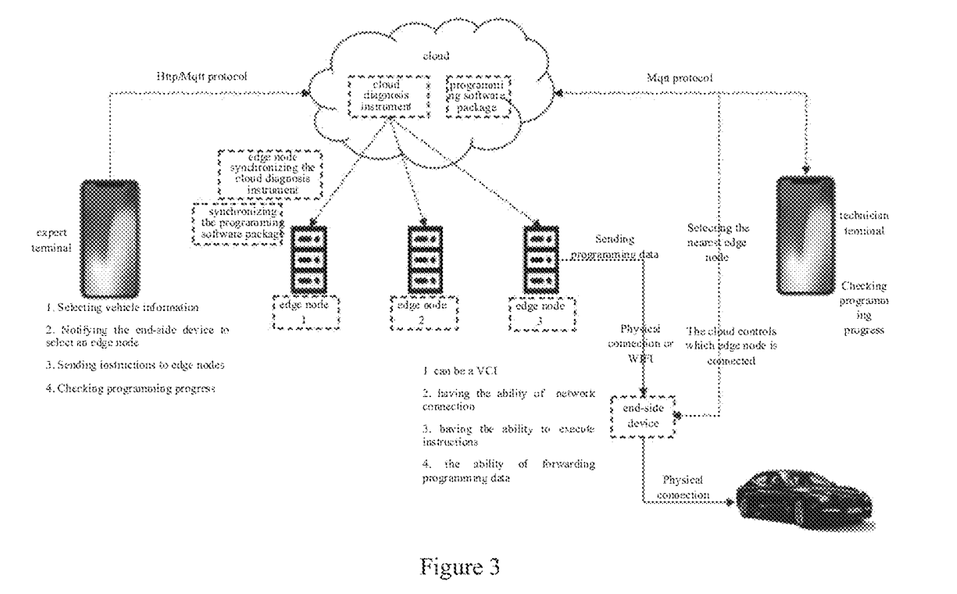
FIG. 3 is a schematic diagram of an overall structure of an automobile diagnosis system provided in an embodiment of the present application.

Further refer to FIG. 3 which is a schematic diagram of the overall structure of an automobile diagnosis system provided in an embodiment of the present application.

As shown in FIG. 3, the cloud (cloud server) is in communication connection with at least one edge node, such as an edge node 1, an edge node 2, and an edge node 3. Wherein, the cloud (cloud server) includes a cloud diagnosis instrument and a programming software package, and each edge node synchronizes the cloud diagnosis instrument and the programming software package.

Wherein, the edge nodes are in communication connection with the end-side device via physical connecting wires or WIFI. The end-side device can be a VCI device, and has the ability to connect network, execute instructions, and forward programming data.

Figure 4:
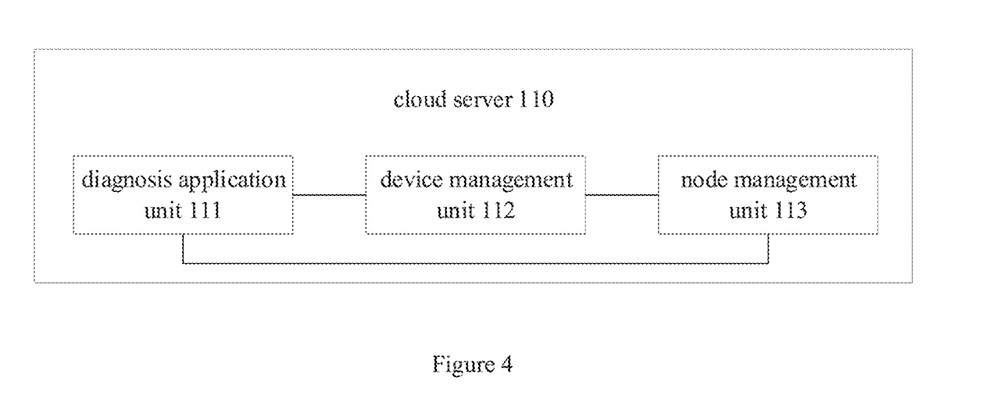
FIG. 4 is a schematic structure diagram of a cloud server in FIG. 1.

Further refer to FIG. 4 which is a schematic structure diagram of the cloud server in FIG. 1.

As shown in FIG. 4, the cloud server 110 includes a diagnosis application unit 111, a device management unit 112, and a node management unit 113, with the diagnosis application unit 111, the device management unit 112, and the node management unit 113 in communication connection with each other.

Wherein, the diagnosis application unit 111 is used to receive the diagnosis instructions and execute the diagnosis instructions to generate the diagnosis data and the vehicle communication logics.

Specifically, the automobile diagnosis system 100 further includes terminal devices. The diagnosis application unit 111 receives the diagnosis instructions sent by the terminal devices and executes the diagnosis instructions to generate the diagnosis data and the vehicle communication logics. For example, after computation and reasoning, the diagnosis application unit 111 believes that vehicle faults can be solved by setting the vehicle's engine parameter to 10 and the gearbox parameter to 20, with the diagnosis data generated as follows: the engine parameter of 10 and the gearbox parameter of 20, and with the vehicle communication logics generated as follows: whether to set the engine parameter or the gearbox parameter first, and what to do if the parameter setting succeeds and what to do if it fails. In the embodiments of the present application, the terminal devices include at least one mobile terminal.

In the embodiments of the present application, the diagnosis application unit executes the diagnosis logics to generate the diagnosis data and the vehicle communication logics. Specifically, the diagnosis instructions include a first diagnosis logic and a second diagnosis logic.

The diagnosis application unit of the cloud server is used to execute the first diagnosis logic to generate first diagnosis data and a first vehicle communication logic.

The edge nodes are used to execute the second diagnosis logic to generate second diagnosis data and a second vehicle communication logic, with the second diagnosis logic less complex than the first diagnosis logic.

In the embodiments of the present application, sufficient computing power is provided by executing the first diagnosis logic of intensive computation in the cloud while the end-side device being only responsible for collecting data and executing computation results, and by dynamic expansion technology, thus improving the computing power of diagnosis in the present application. Moreover, when the vehicle is to be diagnosed, the ultra-low-latency interaction is required between diagnosis applications and the vehicle, and if the vehicle is in direct communication with the cloud diagnosis applications, the vehicle's requirements for latency cannot be guaranteed. In the present application, edge computing is used to automatically find one edge node closest to the vehicle through, the second diagnosis logic of simple interaction is published to the edge node connected to the end-side device, and the interaction is performed between the edge node and the vehicle, so that the vehicle's requirements for time is met, thus solving the problem of time delay and improving the response speed.

In the embodiments of the present application, the diagnosis application unit 111 is connected to the node management unit 113, and the diagnosis application unit 111 is also used to receive the connection instructions and apply for an edge node to the node management unit 113 to enable the node management unit 113 to return available edge nodes; wherein, the available edge nodes include one edge node closest to the vehicle position.

In the embodiments of the present application, after receiving the connection instructions, the diagnosis application unit sends the connection instructions to the device management unit to enable the device management unit to forward the connection instructions to the end device, so that the end-side device is connected to the one edge node closest to the vehicle position.

The device management unit 112 is connected to the connection diagnosis application unit 111, for authenticating the end-side device, and forwarding the connection instructions to the end-side device to connect the end-side device with the edge node.

Specifically, the end-side device uploads its own attribute information to the device management unit, and the device management unit verifies whether the end-side device is a sold device, if so, the authentication succeeds, and if not, the authentication fails. Wherein, the attribute information includes serial numbers, certificates, MAC addresses and other information.

After the authentication of the end-side device succeeds, the device management unit allocates an identity credential to the end-side device, through which the end-side device is connected to the edge node.

The node management unit 113 is used to forward the diagnosis data and the vehicle communication logics to the edge node.

Specifically, the node management unit 113 is in communication connection with the diagnosis application unit 111, receives the diagnosis data and the vehicle communication logic sent by the diagnosis application unit 111, and sends the diagnosis data and the vehicle communication logics to the edge node connected to the end-side device.

In the embodiments of the present application, the cloud server is also used to send the second diagnosis logic to the edge node having the minimum communication delay with the end-side device, so that the edge node executes the second diagnosis logic to generate the second diagnosis data and the second vehicle communication logic, and performs data interaction with the end-side device based on the second diagnosis data and the second vehicle communication logic.

Specifically, the node management unit of the cloud server sends the second diagnosis logic to the edge node having the minimum communication delay with the end-side device, so that the edge node executes the second diagnosis logic to generate the second diagnosis data and the second vehicle communication logic, and performs data interaction with the end-side device based on the second diagnosis data and the second vehicle communication logic.

In the embodiments of the present application, the automobile diagnosis system further includes terminal devices, which are in communication connection with the cloud server, for sending the diagnosis instructions to the cloud server and receiving the diagnosis results sent by the cloud server.

Specifically, the terminal devices include an expert terminal and a technician terminal, both of which are mobile terminals, the expert terminal is used to send programming instructions or the diagnosis instructions to the cloud (cloud server), which executes the programming instructions or the diagnosis instructions. Wherein, the expert terminal is in communication connection with the cloud (cloud server) through the Http protocol or Mqtt protocol, the technician terminal is in communication connection with the cloud (cloud server) through the Mqtt protocol, and the technician terminal is used to check the programming progress.

Specifically, the expert terminal sends the programming instructions or the diagnosis instructions to the cloud (cloud server); wherein the diagnosis instructions include vehicle device information, and the vehicle device information is used to designate the vehicle to be diagnosed, so that the cloud (cloud server) determines the vehicle to be diagnosed and in turn selects an edge node nearby, that is, selects the edge node closest to the vehicle position, or selects the edge node having the minimum communication delay with the end-side device, which is used to be in communication with the end-side device. It can be understood that, generally speaking, the edge node closest to the vehicle position is the edge node having the minimum communication delay with the end-side device.

In the embodiments of the present application, there is provided an automobile diagnosis system which includes a cloud server, an end-side device and at least one edge node. Wherein, the cloud server is in communication connection with each edge node for acquiring and executing the diagnosis instructions, to generate the diagnosis data and the vehicle communication logics, and send the diagnosis data and the vehicle communication logics to the edge node having the minimum communication delay with the end-side device; the edge node is used to perform data interaction with the end-side device based on the diagnosis data and the vehicle communication logics sent by the cloud server, for acquiring the diagnosis results sent by the end-side device and sending the diagnosis results to the cloud server. The end-side device is in communication connection with the edge node and the vehicle, for sending the vehicle data of the vehicle and the diagnosis results to the edge node. On the one hand, the embodiments of the present application can improve the diagnosis ability of computation by the cloud server executing the diagnosis instructions. On the other hand, the data interaction between the edge node and the end-side device enables the remote vehicle assistance diagnosis and the intelligent diagnosis.

Figure 5:
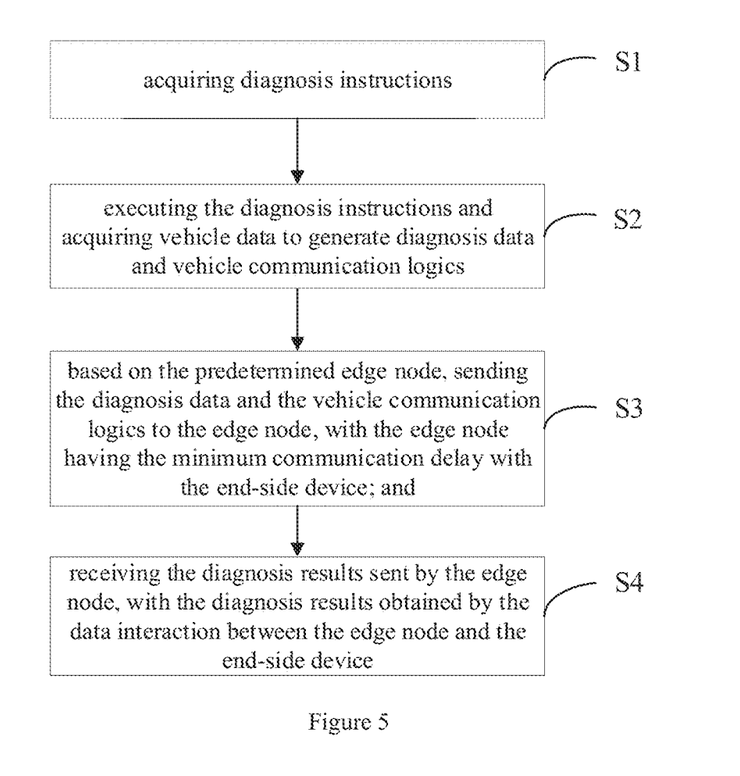
FIG. 5 is a schematic flowchart of an automobile diagnosis method provided in an embodiment of the present application.

Further refer to FIG. 5 which is a schematic flowchart of an automobile diagnosis method provided in an embodiment of the present application.

Wherein, the automobile diagnosis method is applied to the above automobile diagnosis system, and specifically, the automobile diagnosis method is executed by one or more processors in the cloud server of the automobile diagnosis system.

As shown in FIG. 5, the automobile diagnosis method comprises the following steps.

Step S1: acquiring the diagnosis instructions.

Specifically, the cloud server acquires the diagnosis instructions sent by the terminal devices, wherein the terminal devices include one application program through which users send the diagnosis instructions to the cloud server.

Step S2: executing the diagnosis instructions and acquiring the vehicle data to generate the diagnosis data and the vehicle communication logics.

Specifically, the cloud server executes the diagnosis instructions and acquires the vehicle data from the edge node to generate the diagnosis data and the vehicle communication logics. For example, after computation and reasoning, the diagnosis application unit of the cloud server believes that the vehicle faults can be solved by setting the vehicle's engine parameter to 10 and the gearbox parameter to 20, with the diagnosis data generated as follows: the engine parameter of 10 and the gearbox parameter of 20, and with the vehicle communication logics generated as follows: whether to set the engine parameter or the gearbox parameter first, and what to do if the parameter setting succeeds and what to do if it fails.

Specifically, the diagnosis instructions include the first diagnosis logic and the second diagnosis logic.

The cloud server is used to execute the first diagnosis logic to generate the first diagnosis data and the first vehicle communication logic.

The edge node is used to execute the second diagnosis logic to generate the second diagnosis data and the second vehicle communication logic, with the second diagnosis logic less complex than the first diagnosis logic.

In the embodiments of the present application, the method further comprises the following steps.

Sending the second diagnosis logic to the edge node, so that the edge node executes the second diagnosis logic to generate the second diagnosis data and the second vehicle communication logic, and performs data interaction with the end-side device based on the second diagnosis data and the second vehicle communication logic.

Step S3: based on the predetermined edge node, sending the diagnosis data and the vehicle communication logics to the edge node, with the edge node having the minimum communication delay with the end-side device.

Specifically, the cloud server receives the diagnosis instructions sent by the terminal devices. The diagnosis instructions include the vehicle device information, and the vehicle device information is used to designate the vehicle to be diagnosed, so that the cloud server determines the vehicle to be diagnosed and determines an edge node, with the edge node having the minimum communication delay with the end-side device.

The cloud server sends the generated diagnosis data and vehicle communication data to the edge node, and the edge node starts the vehicle communication applications and performs the vehicle communication interaction to acquire the diagnosis results.

Step 4: receiving the diagnosis results sent by the edge node, wherein the diagnosis results are acquired by the data interaction between the edge node and the end-side device.

Specifically, the end-side device performs the communication interaction with the vehicle based on the diagnosis data and the vehicle communication logics to acquire the diagnosis results and send the diagnosis results to the cloud server, wherein the diagnosis results are acquired by the data interaction between the edge node and the end-side device.

Figure 6:
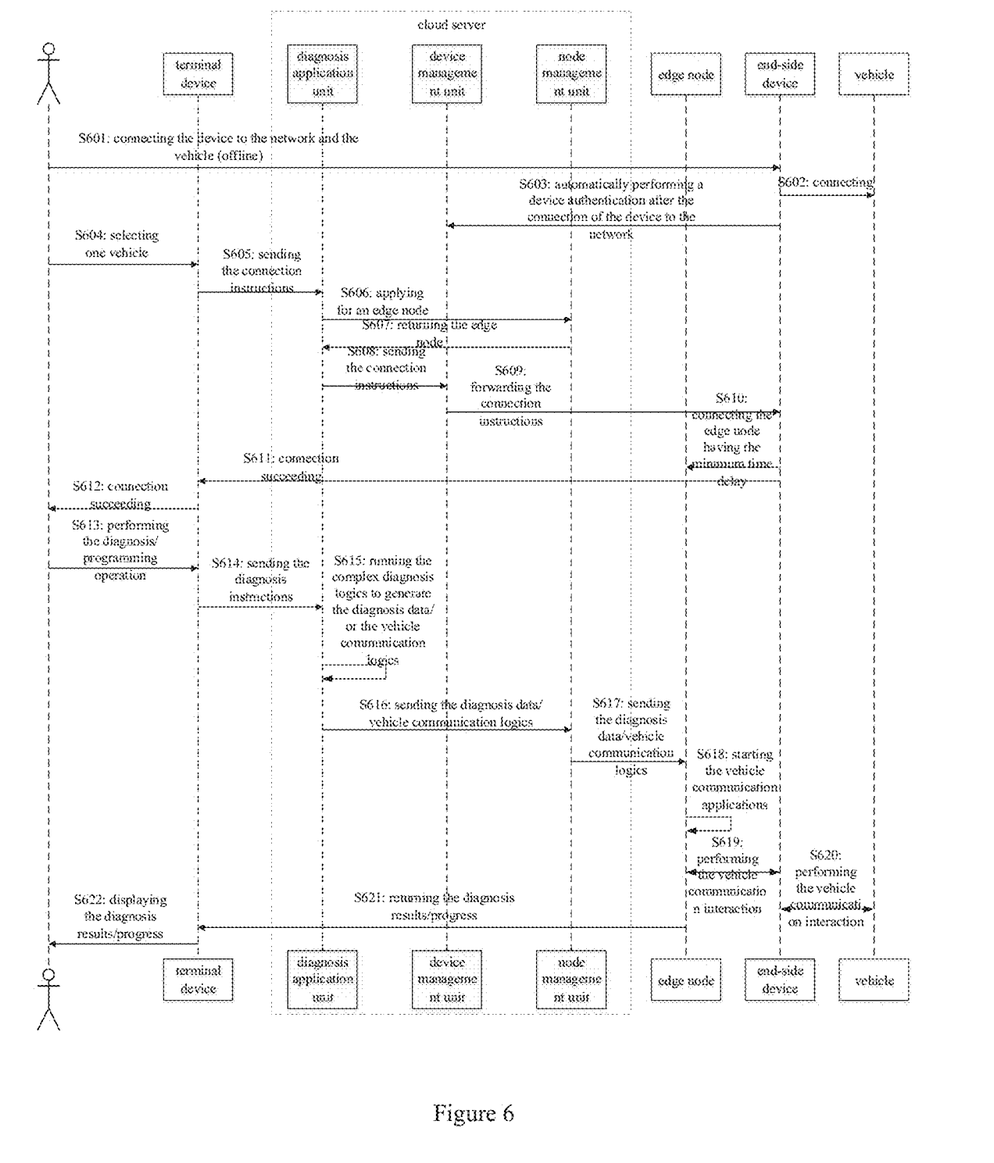
FIG. 6 is a schematic diagram of the interaction in an automobile diagnosis method provided in an embodiment of the present application

Further refer to FIG. 6 which is a schematic diagram of the interaction in an automobile diagnosis method provided in an embodiment of the present application.

As shown in FIG. 6, an interaction process in the automobile diagnosis method comprises the following steps.

Step S601: connecting the device to the network and the vehicle (offline).

Specifically, users connect the end-side device to the network and communicatively connect the end-side device to the vehicle.

Step S602: connecting.

Specifically, the end-side device is communicatively connected to the vehicle.

Step S603: automatically performing a device authentication after the connection of the device to the network.

Specifically, after the end-side device is connected to the network, the device authentication is automatically performed, which comprises: the end-side device uploading its own attribute information to the device management unit of the cloud server, and the device management unit verifying whether the end-side device is a sold device, if so, the authentication succeeding, and if not, the authentication failing. Wherein, the attribute information includes serial numbers, certificates, MAC addresses and other information.

After the authentication of the end-side device succeeds, the device management unit allocates an identity credential to the end-side device, through which the end-side device is connected to the edge node.

Step S604: selecting one vehicle.

Specifically, users select one vehicle through the terminal devices, wherein, the terminal devices are equipped with application programs which are used to send instructions and provide user interfaces for users to operate.

Step S605: sending the connection instructions.

Specifically, the terminal devices send the connection instructions to the diagnosis application unit of the cloud server.

Step S606: applying for an edge node.

Specifically, after receiving the connection instructions, the diagnosis application unit of the cloud server applies for an edge node to the node management unit of the cloud server; and for example, the connection instructions are forward to the node management unit, so that the node management unit determines the edge node having the minimum communication delay with the end-side device.

Step S607: returning the edge node.

Specifically, the node management unit of the cloud server returns the edge node having the minimum communication delay with the end-side device.

Step S608: sending the connection instructions.

Specifically, after the node management unit of the cloud server returns the edge node having the minimum communication delay with the end-side device, the diagnosis application unit sends the connection instructions to the device management unit.

Step S609: forwarding the connection instructions.

Specifically, the device management unit forwards the connection instructions to the end-side device, wherein, the connection instructions include the device information of the edge node, such as device numbers, MAC addresses and other information.

Step S610: connecting the edge node having the minimum time delay.

Specifically, after receiving the connection instructions forwarded by the device management unit, the end-side device is communicatively connected to the edge node having the minimum communication delay.

Step S611: connection succeeding.

Specifically, after the end-side device is successfully connected to the edge node having the minimum communication delay, the message of successful connection is returned to the terminal devices.

Step S612: connection succeeding.

Specifically, the application programs of the terminal devices display the message of successful connection, enabling users to know the successful connection between the end-side device and the edge node.

Step S613: performing the diagnosis/programming operation.

Specifically, users initiate the diagnosis/programming operation through the terminal devices.

Step S614: sending the diagnosis instructions.

Specifically, the terminal devices send the diagnosis instructions to the diagnosis application unit of the cloud server.

Step S615: running the complex diagnosis logics to generate the diagnosis data/or the vehicle communication logics.

Specifically, the diagnosis instructions include the first diagnosis logic and the second diagnosis logic, and the diagnosis application unit of the cloud server is used to execute the first diagnosis logic to generate the first diagnosis data and the first vehicle communication logic, with the first diagnosis logic more complex than the second diagnosis logic.

Step S616: sending the diagnosis data/vehicle communication logics.

Specifically, the diagnosis application unit sends the diagnosis data/vehicle communication logics to the node management unit, so that the node management unit sends the diagnosis data/vehicle communication logics to the edge node. In the embodiments of the present application, the diagnosis application unit is also used to send the second diagnosis logic to the node management unit.

Step S617: sending the diagnosis data/vehicle communication logics.

Specifically, the node management unit sends the diagnosis data/vehicle communication logics to the edge node. In the embodiments of the present application, the node management unit is also used to send the second diagnosis logic to the edge node, so that the edge node executes the second diagnosis logic to generate the second diagnosis data and the second vehicle communication logic, with the second diagnosis logic less complex than the first diagnosis logic.

Step S618: starting the vehicle communication applications.

Specifically, the end-side device starts the vehicle communication applications to perform the communication interaction or data interaction with the vehicle through the vehicle communication applications.

Step S619: performing the vehicle communication interaction.

Specifically, the edge node performs the vehicle data interaction with the end-side device to acquire the diagnosis results/progress.

Step S620: performing the vehicle communication interaction.

Specifically, the end-side device performs the vehicle data interaction with the vehicle.

Step S621: returning the diagnosis results/progress.

Specifically, the edge node returns the diagnosis results/progress to the terminal devices.

Step S622: displaying the diagnosis results/progress.

Specifically, the terminal devices display the diagnosis results/progress to users through the application programs.

In the embodiments of the present application, there is provided an automobile diagnosis method which is applied to the above automobile diagnosis system. The method comprises: obtaining the diagnosis instructions; performing and the diagnosis instructions and acquiring the vehicle data to generate the diagnosis data and the vehicle communication logics; based on the predetermined edge node, sending the diagnosis data and the vehicle communication logics to the edge node, with the edge node having the minimum communication delay with the end-side device; and, receiving the diagnosis results sent by the edge node, with the diagnosis results obtained by the data interaction between the edge node and the end-side device. On the one hand, the embodiments of the present application can improve the diagnosis ability of computation by the cloud server executing the diagnosis instructions. On the other hand, the data interaction between the edge node and the end-side device enables the remote vehicle assistance diagnosis and the intelligent diagnosis.

Figure 7:
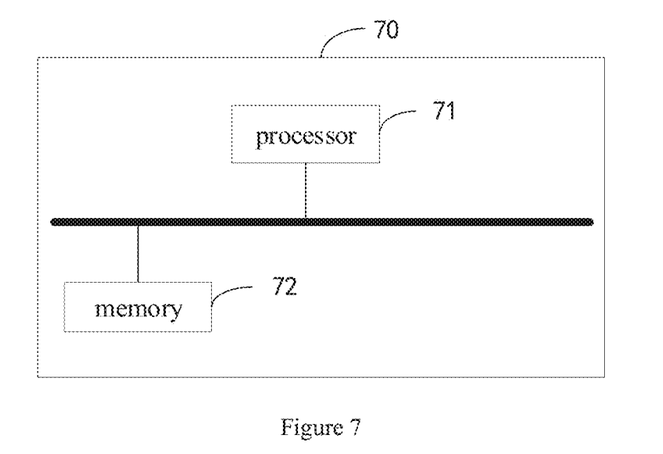
FIG. 7 is a schematic diagram of a hardware structure of a cloud server provided in an embodiment of the present application.

Further refer to FIG. 7 which is a schematic diagram of the hardware structure of a cloud server provided in an embodiment of the present application.

Wherein, the cloud server 70 includes a processor/processors 71 and a memory 72, wherein, one processor 71 is taken as an example in FIG. 7.

The processor 71 and the memory 72 can be connected through a bus or by other means, wherein, the connection through a bus is taken as an example in FIG. 7.

As a non-volatile computer-readable storage medium, the memory 72 can be used to store non-volatile software programs, non-volatile computer-executable programs and modules, such as the units (for example, individual units shown in FIG. 7.) corresponding to an automobile diagnosis method in the embodiments of the present invention. The processor 71 runs the non-volatile software programs, instructions and modules stored in the memory 72 to execute various functional applications and data processing in the automobile diagnosis method, that is, implement the automobile diagnosis method in the above method embodiments and the functions of the individual modules and units in the above device embodiments.

The memory 72 may include high-speed random access memories, and may also include non-volatile memories, such as at least one magnetic disk storage device, flash memory device, or other non-volatile solid-state storage devices. In some embodiments, the memory 72 optionally includes memories located remotely relative to the processor 71, which may be connected to the processor 71 via networks. Examples of the above networks include but are not limited to the Internet, intranets, local area networks, mobile communication networks and combinations thereof.

Figure 8:
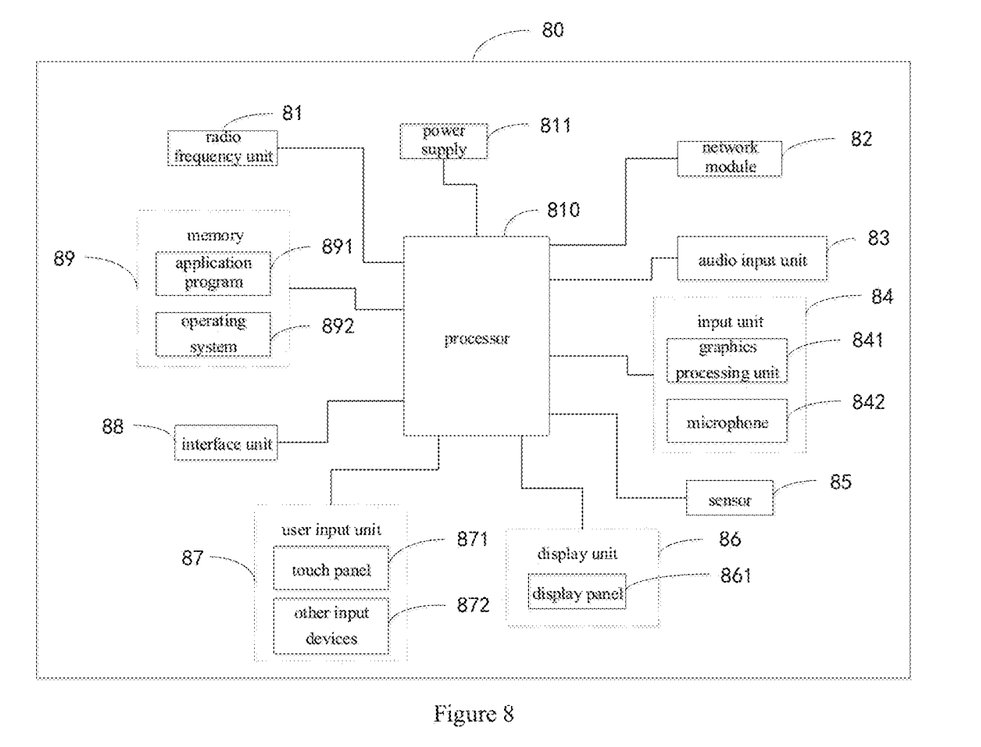
FIG. 8 is a schematic structure diagram of an end-side device provided in an embodiment of the present application.

Refer to FIG. 8 which is a schematic diagram of the hardware structure of an end-side device in an embodiment of the present application.

As shown in FIG. 8, the end-side device 80 includes but is not limited to a radio frequency unit 81, a network module 82, an audio output unit 83, an input unit 84, a sensor 85, a display unit 86, an user input unit 87, an interface unit 88, a memory 89, a processor 810, as well as a power supply 811 and other components. The end-side device 80 also includes a camera. Those skilled in the art can understand that the structure of the end-side device shown in FIG. 8 does not constitute a limitation of the end-side device, and the end-side device may include more or fewer components than shown in the figure, or may combine with some components, or may have a different component arrangement. In the embodiments of the present application, the end-side device includes but is not limited to televisions, mobile phones, tablet PCs, laptops, handheld computers, vehicle-mounted terminals, wearable devices, pedometers and the like.

The processor 810 is used to acquire the connection instructions to control the edge node having the minimum connection delay with the end-side device, and is used to start the vehicle communication applications to perform the vehicle communication interaction (for example, acquire the vehicle data).

It should be understood that in the embodiments of the present application, the radio frequency unit 81 can be used to receive and send information, or receive and send signals during a call. Specifically, after receiving downlink data from the base station, the radio frequency unit 81 sends the downlink data to the processor 810 to process them; additionally, the radio frequency unit 81 sends uplink data to the base station. Typically, the radio frequency unit 81 includes but is not limited to, antennas, at least one amplifier, transceivers, couplers, low-noise amplifiers, duplexer, etc. In addition, the radio frequency unit 81 can also be in communication with networks and other devices through a wireless communication system.

The end-side device 80 provides users with the wireless broadband Internet access through the network module 82, for example, to help users receive and send emails, browse web pages and access streaming media.

The audio output unit 83 may convert audio data received by the radio frequency unit 81 or the network module 82 or stored in the memory 89 into audio signals and output them as sounds. Furthermore, the audio output unit 83 may also provide audio output (e.g. call signal reception sound, message reception sound, etc.) related to specific functions performed by the end-side device 80. The audio output unit 83 includes speakers, buzzers, receivers and the like.

The input unit 84 is used to receive audio or video signals. The input unit 84 may include a graphics processing unit (GPU) 841 and a microphone 842. The graphics processing unit 841 processes the target image of a still picture or video obtained by an image capture device (such as a camera) in video capture mode or image capture mode. The processed image frames may be displayed on the display unit 86. The image frames processed by the graphics processing unit 841 may be stored in the memory 89 (or other storage media) or sent via the radio frequency unit 81 or the network module 82. The microphone 842 can receive sounds and process such sounds into audio data. In phone call mode, the processed audio data can be converted into a format that can be sent to a mobile communication base station via the radio frequency unit 81 to output it.

The end-side device 80 also includes at least a type of sensor 85, such as light sensors, motion sensors and other sensors. Specifically, the light sensors include an ambient light sensor and a proximity sensor, wherein the ambient light sensor can adjust the brightness of the display panel 861 based on the brightness of the ambient light, and the proximity sensor can close the display panel 861 and/or backlight when the end-side device 80 moves beside ears. As a type of motion sensor, an accelerometer sensor can detect the magnitude of acceleration in various directions (usually in three axes), can detect the magnitude and direction of gravity when stationary, and can be used to identify the posture (such as horizontal and vertical screen switching, related games, magnetometer posture calibration) of the end-side device, vibration recognition-related functions (such as pedometers, tapping), and so on. The sensor 85 may also include a fingerprint sensor, a pressure sensor, an iris sensor, a molecular sensor, a gyroscope, a barometer, a hygrometer, a thermometer, an infrared sensor, etc., which will not be further described here.

The display unit 86 is used to display information input by users or information provided for users. The display unit 86 may include the display panel 861, which may be configured in the form of Liquid Crystal Display (LCD), Organic Light-Emitting Diode (OLED) and the like.

The user input unit 87 may be used to receive the input numeric or character information, and generate the key signal input related to user settings and function control of the end-side device. Specifically, the user input unit 87 includes a touch panel 871 and other input devices 872. The touch panel 871 also known as the touch screen, can collect users' touch operations thereon or near it (for example, operations users perform on or near the touch panel 871 by using any suitable object or accessory such as fingers, styluses). The touch panel 871 may include the two parts of a touch detection device and a touch controller. Wherein, the touch detection device detects the users' touch orientations, detects the signals brought by the touch operations and transmits the signals to the touch controller; the touch controller receives the touch information from the touch detection device, converts it into contact point coordinates and then sends them to the processor 810, and receives the commands sent by the processor 810 and executes them. In addition, the touch panel 871 can be implemented in various types such as resistive, capacitive, infrared, and surface acoustic wave types. In addition to the touch panel 871, the user input unit 87 may include other input devices 872. Specifically, other input devices 872 may include but are not limited to physical keyboards, function keys (such as volume control keys, switch keys, etc.), trackballs, mice, and joysticks, which will not be further described here.

Further, the touch panel 871 can cover the display panel 861. When the touch panel 871 detects a touch operation thereon or near it, the touch operation is transmitted to the processor 810 to determine the type of the touch event, and then the processor 810 provides the corresponding visual output on the display panel 861 according to the type of the touch event. Although in FIG. 8, the touch panel 871 and the display panel 861 are used as two independent components to realize the input and output functions of the end-side device, in some embodiments, the touch panel 871 and the display panel 861 can be integrated to realize the input and output functions of the end-side device, which is not specifically limited herein.

The interface unit 88 is an interface for connecting external devices and the end-side device 80. For example, the external devices may include wired or wireless headphone ports, external power supply (or battery charger) ports, wired or wireless data ports, memory card ports, ports for connecting devices having recognition modules, audio input/output (I/O) ports, video V/O ports, earphone ports, etc. The interface unit 88 can be used to receive the input (such as data information, electric power, etc.) from the external devices and transmit the received input to one or more components in the end-side device 80, or can be used to transmit data between the end-side device 80 and the external devices.

The memory 89 may be used to store software programs as well as various data. The memory 89 may mainly include a program storage area and a data storage area, wherein, the program storage area can store an application program 891 required for at least one function (such as sound playback function, image playback function, etc.) and an operating system 892; the data storage area can store data (such as audio data, phone book, etc.) created based on the use of cellphone. Moreover, the memory 89 may include high-speed random access memories, and may also include non-volatile memories, such as at least one magnetic disk storage device, flash memory device, or other volatile solid-state storage devices.

The processor 810 is the control center of the end-side device and uses various interfaces and lines to connect various parts of the entire end-side device. The processor 810 performs various functions of the end-side device and processes data by running or executing software programs and/or modules stored in the memory 89 and calling data stored in the memory 89, thereby overall monitoring the end-side device. The processor 810 may include one or more processing units. Preferably, the processor 810 may integrate an application processor and a modem processor; wherein the application processor mainly processes the operating system, the user interfaces, the application programs, etc., and the modem processor mainly process wireless communications. It can be understood that the above modem processor may not be integrated into the processor 810.

The end-side device 80 may also include a power supply 811 (such as a battery) that supplies power to various components. Preferably, the power supply 811 may be logically connected to the processor 810 through a power supply management system, thereby achieving functions, such as charging management, discharging management and power consumption management, through the power supply management system.

Additionally, the end-side device 80 includes some function modules not shown, which will not be further described herein.

Preferably, in the embodiments of the present application is also provided an end-side device which includes a processor 810, a memory 89, and computer programs stored on the memory 89 and executable on the processor 810. When the computer programs are executed by the processor 810, each process of the above automobile diagnosis method embodiments can be implemented, with the same technical effects achieved, which will not be further described herein for avoiding repetition.

In the embodiments of the present application is also provided a computer-readable storage medium on which computer programs are stored. When the computer programs are executed by one or more processors, each process of the above automobile diagnosis method embodiments can be implemented, with the same technical effects achieved, which will not be further described herein for avoiding repetition. Wherein, the computer-readable storage medium, such as Read-Only Memory (ROM), Random Access Memory (RAM), magnetic disk or optical disk, etc.

It should be noted that, herein the terms "comprising", "including" or any other variations thereof are intended to cover a non-exclusive inclusion, so that a process, method, article or apparatus including a series of elements not only includes those elements, but also includes other elements not expressly listed or also includes elements inherent in such a process, method, article or apparatus. Without further limitations, an element limited by the statement "including a . . . " does not exclude the existence of another identical element in the process, method, article, or apparatus that includes that element.

The apparatus or device embodiments described above are only illustrative, wherein the unit modules described as separate components may or may not be physically separated, and the components shown as module units may or may not be physical units, that is, they can be located in one place or distributed across multiple network module units. Some or all of the modules can be selected according to actual needs to achieve the purposes of the embodiment solutions.

Through the above description of the embodiments, those skilled in the art can clearly understand that the methods of the above embodiment methods can be implemented by means of software plus the necessary general hardware platforms, and of course, also by means of hardware, but in many cases the former is the better embodiment mode. Based on such understanding, the technical solutions of the present application essentially or the part thereof that contributes to the prior art can be embodied in the form of a software product, and the computer software product is stored in a storage medium (such as ROM/RAM, magnetic disk, optical disk), including several instructions to enable a terminal (which can be a mobile terminal, personal computer, server, or network device, etc.) to execute the methods described in various embodiments of the present application or certain parts thereof.

Finally, it should be noted that the embodiments described above in conjunction with the accompanying drawings are only used to illustrate the technical solutions of the present application, and the present application is not limited to the above specific embodiments which are only illustrative and not restrictive. Under the idea of the present application, the above embodiments or the technical features in different embodiments can also be combined with each other, the steps can be implemented in any order, and there are many other changes in different aspects of the present application as described above, which are not provided in the details for the sake of simplicity. Although the present application has been described in detail with reference to the foregoing embodiments, those skilled in the art should understand that the technical solutions recorded in the foregoing embodiments can still be modified, or some of the technical features can be equivalently substituted; and these modifications or substitutions do not cause the essence of the corresponding technical solutions to depart from the scope of the technical solutions in the embodiments of the present application.

The invention claimed is:

1. An automobile diagnosis system, comprising a cloud server, an end-side device and at least one edge node; wherein the cloud server is in communication connection with each edge node, is used to acquire and execute diagnosis instructions to generate diagnosis data and vehicle communication logics, determine an edge node having the minimum communication delay with the end-side device as a target edge node, and send the diagnosis data and the vehicle communication logics to the target edge node;

the target edge node is used for performing data interaction with the end-side device based on the diagnosis data and the vehicle communication logics sent by the cloud server, to acquire diagnosis results sent by the end-side device and send the diagnosis results to the cloud server; and the end-side device is in communication connection with the target edge node and a vehicle, and is used for sending vehicle data of the vehicle and the diagnosis results to the target edge node.

2. The system according to claim 1, wherein, after receiving connection instructions, the cloud server determines an edge node closest to the vehicle position in communication with the end-side device as the target edge node, with the target edge node closest to the vehicle position having the minimum communication delay with the end-side device.

3. The system according to claim 1, wherein, the cloud server comprises:

a diagnosis application unit, for receiving and executing the diagnosis instructions to generate the diagnosis data and the vehicle communication logics;

a device management unit connected to the diagnosis application unit, wherein, the device management unit is used to authenticate the end-side device and forward the connection instructions to the end-side device, so that the end-side device is connected to the target edge node; and a node management unit, for forwarding the diagnosis data and the vehicle communication logics to the target edge node.

4. The system according to claim 3, wherein, the diagnosis application unit is also used to receive the connection instructions and apply for an edge node to the node management unit, so that the node management unit returns available edge nodes, wherein, the available edge nodes comprise an edge node closest to the vehicle position.

5. The system according to claim 4, wherein, after receiving the connection instructions, the diagnosis application unit sends the connection instructions to the device management unit, so that the device management unit forwards the connection instructions to the end-side device, for the end-side device to be connected to the edge node closest to the vehicle position.

6. The system according to claim 1, wherein, the diagnosis instructions comprise a first diagnosis logic and a second diagnosis logic;

the cloud server is also used to execute the first diagnosis logic to generate first diagnosis data and a first vehicle communication logic; and the target edge node is also used to execute the second diagnosis logic to generate second diagnosis data and a second vehicle communication logic, with the second diagnosis logic requiring less compute than the first diagnosis logic.

7. The system according to claim 6, wherein, the cloud server is also used to send the second diagnosis logic to the target edge node having the minimum communication delay with the end-side device, so that the target edge node executes the second diagnosis logic to generate the second diagnosis data and the second vehicle communication logic, and performs data interaction with the end-side device based on the second diagnosis data and the second vehicle communication logic.

8. The system according to claim 1, wherein, after performing a read and write operation of the vehicle data, the target edge node automatically clears the diagnosis data and the vehicle communication logics thereon.

9. The system according to claim 1, further comprising:
   terminal devices in communication connection with the cloud server, which are used to send the diagnosis instructions to the cloud server and receive the diagnosis results sent by the cloud server.

10. An automobile diagnosis method, applied to the automobile diagnosis system according to claim 1, wherein the method comprises:
   acquiring the diagnosis instructions;
   executing the diagnosis instructions and acquiring the vehicle data to generate the diagnosis data and the vehicle communication logics;
   based on a predetermined edge node which is the target edge node having the minimum communication delay with the end-side device, sending the diagnosis data and the vehicle communication logics to the target edge node; and
   receiving the diagnosis results sent by the target edge node, with the diagnosis results obtained by the data interaction between the target edge node and the end-side device.

11. The method according to claim 10, wherein, the diagnosis instructions comprise the first diagnosis logic and the second diagnosis logic, the method further comprises:
   the cloud server executing the first diagnosis logic to generate the first diagnosis data and the first vehicle communication logic; and
   the edge node executing the second diagnosis logic to generate the second diagnosis data and the second vehicle communication logic, with the second diagnosis logic less complex requiring less compute than the first diagnosis logic.

12. The method according to claim 11, further comprising:
   sending the second diagnosis logic to the target edge node, so that the target edge node executes the second diagnosis logic to generate the second diagnosis data and the second vehicle communication logic, and performs the data interaction with the end-side device based on the second diagnosis data and the second vehicle communication logic.

13. A cloud server, comprising:
   at least one processor; and
   a memory in communication connection with the at least one processor;
   wherein, the memory stores instructions executable by the at least one processor, and the instructions are executed by the at least one processor to enable the at least one processor to execute the automobile diagnosis method according to claim 10.

* * * * *